United States Patent
Markandaya Lakshminarasimha et al.

(10) Patent No.: US 11,562,077 B2
(45) Date of Patent: Jan. 24, 2023

(54) WORKLOAD AWARE SECURITY PATCH MANAGEMENT

(71) Applicant: HEWLETT PACKARD ENTERPRISE DEVELOPMENT LP, Houston, TX (US)

(72) Inventors: Umesh Markandaya Lakshminarasimha, Bangalore (IN); Vijay Suryanarayana, Bangalore (IN); Naveena Kedlaya, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 313 days.

(21) Appl. No.: 16/844,321

(22) Filed: Apr. 9, 2020

(65) Prior Publication Data
US 2021/0319111 A1 Oct. 14, 2021

(51) Int. Cl.
*G06F 21/00* (2013.01)
*G06F 21/57* (2013.01)
*G06F 8/65* (2018.01)
*G06F 9/50* (2006.01)

(52) U.S. Cl.
CPC .............. *G06F 21/577* (2013.01); *G06F 8/65* (2013.01); *G06F 9/505* (2013.01); *G06F 9/5083* (2013.01)

(58) Field of Classification Search
None
See application file for complete search history.

(56) References Cited

U.S. PATENT DOCUMENTS

| 8,434,077 | B2 | 4/2013 | Chess et al. |
| 8,832,827 | B2 * | 9/2014 | Herscovitz .......... G06F 11/0757 726/22 |
| 8,893,106 | B2 | 11/2014 | Ningombam et al. |

(Continued)

OTHER PUBLICATIONS

HPE, "HPE Greenlake Hybrid Cloud: Hybrid Cloud Made Simple", available online at <https://www.hpe.com/us/en/services/it-consumption.html?chatsrc=ot-en&jumpid=ps_jk4h6izbpr_aid-510455007&gclid=EAlaIQobChMlj6u5wMXo5AIVBNVkCh0m3A6oEAAYASAAEgKmh_D_BwE&gclsrc=aw.ds.>, retrieved on May 6, 2020, 7 pages.

(Continued)

*Primary Examiner* — Maung T Lwin
(74) *Attorney, Agent, or Firm* — Mauriel Kapouytian Woods LLP

(57) ABSTRACT

Example implementations relate to method and system for securing a workload from a security vulnerability based on management of critical patches for the workload. The method includes obtaining information of existing patches for each of a plurality of infrastructure resources that are required to execute the workload, where the infrastructure resources are segregated as multiple layers. The method further includes determining dependency of the infrastructure resources across the multiple layers and identifying the security vulnerability related to the infrastructure resources. The method further includes evaluating perceived criticalities of first and second new patches for the security vulnerability based a workload weightage, a resource age of the infrastructure resources, and an actual criticality of the first and second new patches. Further, the method includes installing the first new patch followed by the second new patch on the infrastructure resources based on the perceived criticalities, in an order of the determined dependency.

20 Claims, 5 Drawing Sheets

(56) References Cited

U.S. PATENT DOCUMENTS

| | | |
|---|---|---|
| 9,563,777 B2 * | 2/2017 | Deng .................... G06F 21/577 |
| 9,696,985 B1 | 7/2017 | Gupta et al. |
| 10,255,064 B2 | 4/2019 | Li et al. |
| 2005/0120244 A1 * | 6/2005 | Choi .................... H04L 63/083 |
| | | 726/4 |
| 2015/0106939 A1 * | 4/2015 | Lietz .................. H04L 63/1433 |
| | | 726/25 |
| 2016/0103671 A1 | 4/2016 | Curran et al. |
| 2016/0217288 A1 * | 7/2016 | Serrano ................. G06F 21/577 |
| 2017/0214701 A1 * | 7/2017 | Hasan ................. H04L 63/1491 |
| 2018/0191766 A1 * | 7/2018 | Holeman ................ H04L 63/20 |
| 2019/0026091 A1 | 1/2019 | Gao et al. |
| 2020/0380136 A1 * | 12/2020 | Patel .................... G06F 21/577 |
| 2021/0173935 A1 * | 6/2021 | Ramasamy ........... G06F 21/577 |

OTHER PUBLICATIONS

Huang et al., "Patch Management Automation for Enterprise Cloud", NOMS 2012 Application Track, 2012, pp. 1-15.

Susan Moore, "Smarter With Gartner: Focus on the Biggest Security Threats, Not the Most Publicized", available online at <https://www.gartner.com/smarterwithgartner/focus-on-the-biggest-security-threats-not-the-most-publicized/>, Gartner Inc., Nov. 2, 2017, 10 pages.

* cited by examiner

WORKLOAD AWARE SECURITY PATCH MANAGEMENT

BACKGROUND

Cloud computing service is an on-demand delivery of computing infrastructure resources for executing workloads of customers. The computing infrastructure resources may include servers, power supply and management devices, local disks, enclosures, storage systems, storage area networks (SANs), networks, networking interconnects, network fabric, storage fabric, and the like. In today's digital transformation world, customers may deploy their workload in a hybrid cloud (private or public cloud) based on business requirements. However, there may be security vulnerabilities in the infrastructure resources identified for executing the customer's workload. Therefore, ensuring security of such infrastructure resources is a challenge in the hybrid cloud environment.

BRIEF DESCRIPTION OF THE DRAWINGS

Various examples will be described below with reference to the following figures.

Figure 1:
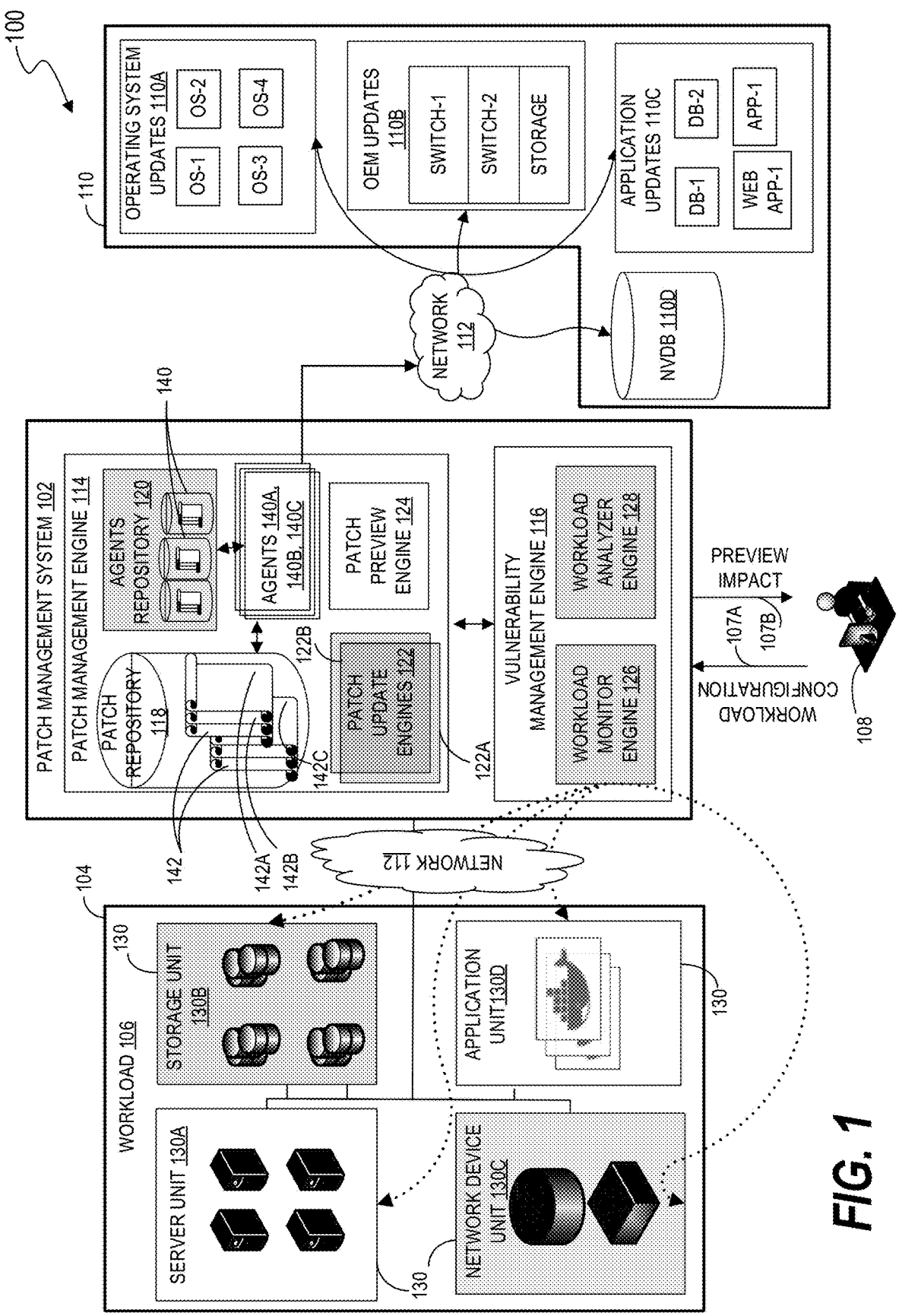
FIG. 1 is an example computing system, for example, a patch management system for secure management of a workload, in accordance with embodiments of the present disclosure.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The present disclosure describes example implementations of a system and a method for securing a workload from security vulnerabilities based on management of new patches that are identified to redress the security vulnerabilities of the workload. In particular, the present disclosure discloses utilizing a computing system, such as a patch management system for effective management of the new patches. In certain embodiments, the patch management system may first evaluate perceived criticalities of each of the plurality of new patches based on one or more parameters related to the workload and the security vulnerability. Later, the patch management system may install each of the plurality of new patches on the corresponding infrastructure resource based on the perceived criticality of each new patch, in an order of dependency of the plurality of infrastructure resources.

For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 5 is an example and is not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

Typically, customers may use at least some of a plurality of computing infrastructure resources hosted in a cloud environment, for executing or running the workload based on their business requirement. Further, the customers may spend considerable amount of time, effort, and money in securing those identified infrastructure resources by figuring out vulnerabilities and remediating the vulnerabilities frequently. However, security vulnerabilities may be complex in heterogeneous infrastructure resources and a diversified environment, such as a hybrid cloud environment. In such scenarios, the need for protecting the infrastructure resources for confidentiality, integrity, and availability is a daunting task. Further, even a single vulnerability in any one of the infrastructure resources may be enough to de-stabilize the workload in totality, thereby leading to business downtime. Most of the current security management system may merely install all new patches to secure a particular infrastructure resource from the identified security vulnerability. However, such security management system may not have capabilities to holistically access and secure the whole workload in entirety, from the security vulnerability. Further, the current security management system may merely install all available new patches on the particular infrastructure in one single instance, irrespective of the criticality of those new patches, thus resulting in stalling the workload for a longer duration, while installing those new patches.

A technical solution to the aforementioned problems may include utilization of a computing system, such as a patch management system for secure management of a whole workload from one or more security vulnerabilities. In some examples, the patch management system may first identify a security vulnerability in the plurality of infrastructure resources that are required to execute the workload. Later, the patch management system may determine dependency of the plurality of infrastructure resources across multiple layers of the plurality of infrastructure resources. The patch management system may then evaluate perceived criticalities of each of a plurality of new patches, for example, a first new patch and a second new patch that are identified to remediate the security vulnerability of the workload based on a plurality of parameters including a workload weightage, a resource age of the plurality of infrastructure resources, and an actual criticality of the first and second new patches for the security vulnerability.

Accordingly, the patch management system may install the first new patch followed by the second new patch based on the perceived criticalities, in an order of determined dependency of the plurality of infrastructure resources, so as to secure the workload from the security vulnerability. Thus, the patch management system of the present disclosure may holistically secure the entire workload from the one or more security vulnerabilities. Since, the patch management system determines perceived criticalities of all new patches before installing the new patches, it reduces the issues related to merely installing all new patches. Additionally, since the patch management system installs the critical new patches and defer installing the non-critical new patches, it reduces the possibility of stalling the workload for longer duration, while installing the new patches. Further, since the patch management system identifies security vulnerabilities in each of the plurality of infrastructure resources, it may holistically secure the entire workload, and not merely secure one particular infrastructure resource, as in the case of the conventional security management system.

It may be noted herein that the term "workload" may refer to an application program running on the plurality of infrastructure resources and having multiple users connected to the plurality of infrastructure resources and interacting with the application program. The term "infrastructure resources" may refer to computing resources, such as servers, storage systems, storage area networks (SANs), networks, networking interconnects, and the like, for executing or running the workload.

The term "multiple layer" may refer to a logical separation of the plurality of infrastructure resources based on their functions and interactions, in some sequential and hierarchical way. For example, each layer in the multiple layers may have an interface only to the layer above it and the layer below it.

The term "dependency" may refer to a state in which one infrastructure resource may use functions of another infrastructure resource to perform its functions. For example, an application, such as a first database application (e.g., an ORACLE database) may have the dependency on an operating system, such as a MICROSOFT WINDOWS or a LINUX.

The term "vulnerability" may refer to a weakness in a software program of the infrastructure resource that may allow attackers or hackers to reduce an integrity of information related to that infrastructure resource.

The term "new patch" may refer to an update to some portion of the software program of the infrastructure resource to retain the integrity of the information related to that infrastructure resource.

The term "perceived criticality" may refer to a customer determined importance or relevance of the new patch for remediating the security vulnerability of the infrastructure resource.

The term "workload weightage" may refer to customer perceived importance or relevance of the workload depending on the nature of the workload, for example, a mission-critical production workload or a normal production workload or a development workload, or a testing workload, and the like.

The term "resource age" may refer to a version of the software program related to the infrastructure resource or a deployment year of that infrastructure resource. For example, the version of the operating system, such as WINDOWS 2008 may define the age of that infrastructure resource. Further, higher the workload age may mean an older version of the operating system version, and lesser the workload age may mean a latest version of the operating system version.

The term "actual criticality" may refer to an actual importance or relevance of the new patch that is defined by an industry standard, based on the criticality of the security vulnerability. The term "predefined criticality" may refer to a threshold value of the perceived criticality that the customer or the administrator has defined to safeguard the infrastructure resources that are identified for executing the workload.

In some examples, the patch management system may install only those new patches having the perceived criticality greater than a predefined criticality. In one or more examples, the predefined criticality may be defined by the customer or the administrator of the workload. In some other examples, the patch management system may defer the installation of all those new patches having the perceived criticality lesser than the predefined criticality. In such examples, the patch management system may install such deferred new patch either during a pre-scheduled patch update period or window for the workload or after re-evaluating the perceived criticality of such deferred new patch to determine that the perceived criticality is now greater than the predefined criticality, based on a revision of the at least one parameter related to the workload or the security vulnerability.

In some examples, the patch management system may obtain information about the one or more security vulnerabilities of the infrastructure resources for executing the workload, from a national vulnerability database (NVDB). Also, the patch management system may obtain the actual criticality of the one or more new patches to redress each of the one or more security vulnerabilities, from the NVDB. In such examples, the patch management system may first analyze the existing patches to determine if the identified security vulnerability is already remediated in the plurality of infrastructure resources, before installing the one or more new patches, for example, a first new patch and a second new patch. In such examples, if it is identified that the existing patches have not redressed the identified security vulnerability, the patch management system may download the first and second new patches from respective sources or a patch repository.

In some examples, the patch management system may include one or more resource-specific agents from a plurality of resource-specific agents for downloading the first and second new patches from the respective sources. It may be noted herein that the respective sources for downloading the new patches may be respective vendor websites or portals, to which the infrastructure resource belongs, for example, a manufacturer patch update website may be used for downloading the new patches for the infrastructure resources belonging to manufacturer. Further, the patch management system may identify at least one patch update engine of a plurality of patch update engines based on a quality of communication index, for installing the new patches on the plurality of infrastructure resources. It may be noted herein that the term "quality of communication index" may refer to a qualification or features of the patch update engine that are required to install the new patches on the plurality of infrastructure resources.

In some examples, the patch management system of the present disclosure may further monitor a topology of identified infrastructure resources to determine addition of a new infrastructure resource for executing the workload. In such examples, the patch update engine may install one or more new patches on the new infrastructure resources, in the order of determined dependency so as to secure the workload from the identified security vulnerability.

FIG. 1 illustrates an example environment 100 in which a computing system, such as a patch management system 102 is operably coupled to a cloud computing system 104 for secure management of a workload 106 hosted in the cloud computing system 104. In some examples, the example environment 100 may additionally include a plurality of external computing systems 110. The example environment 100 may be implemented as an enterprise system or a consumer system, or an industrial system that facilitates to execute or run the workload 106 for delivering intended service to a customer, and secure the workload 106 in parallel from one or more security vulnerabilities. It may be noted herein that the cloud computing system 104 may be hosted on a datacenter (not labeled) that is either owned by the customer or by an external customer, or combinations thereof.

In some examples, the patch management system 102 and the cloud computing system 104 may be controlled or managed by an administrator 108. It may be noted herein that the administrator 108 may a representative of the datacenter or the cloud computing system 104. In some examples, the patch management system 102 may provide a graphical user interface (GUI) for the administrator 108 to interact and manage the example environment 100. In some other examples, the patch management system 102 may provide a command-line interface for the administrator 108 to interact and manage the example environment 100.

In some examples, the patch management system 102 may be a server deployed outside the cloud computing system 104. However, in some other examples, the patch management system 102 may be deployed in the datacenter along with the workload 106. In one or more examples, the patch management system 102 includes a patch management engine 114 and a vulnerability management engine 116. The patch management engine 114 may include a patch repository 118, agents repository 120, patch update engines 122, and a patch preview engine 124. Similarly, the vulnerability management engine 116 may include a workload monitor engine 126 and a workload analyzer engine 128. In one or more examples, the patch management engine 114 and the vulnerability management engine 116 may be implemented using a processing resource (not shown) of the patch management system 102. In some examples, the processing resource may implement functionalities of the patch repository 118, the agents repository 120, the patch update engines 122, the patch preview engine 124, the workload monitor engine 126, and the workload analyzer engine 128 by executing program instructions stored in a machine readable medium (not shown) of the patch management system 102. The functionalities of the patch repository 118, the agents repository 120, the patch update engines 122, the patch preview engine 124, the workload monitor engine 126, and the workload analyzer engine 128 are described in greater details below.

In some examples, the patch management system 102 is operably connected to the cloud computing system 104 and the plurality of external computing systems 110 over a network 112. In such examples, the network 112 may be a TCP/IP (Transmission Control Protocol/Internet Protocol) network, which is a suite of communication protocols used to interconnect network devices on internet.

The datacenter may include a lot of infrastructure resources, such as servers, cooling devices, power supply and management devices, local disks, enclosures, storage systems, storage area networks (SANs), networks, networking interconnects, network fabric, storage fabric, and the like. In such examples, the cloud computing system 104 may include a plurality of infrastructure resources 130 from the lot of infrastructure resources that are identified from the datacenter, for executing the workload 106 of the customer. For example, the cloud computing system 104 includes a plurality of infrastructure resources 130, such as server unit 130A, storage unit 130B, network device unit 130C, and application unit 130D. As discussed hereinabove, the workload 106 may be executed on the plurality of infrastructure resources 130 for performing the intended functions of the customer's business. In certain examples, the workload 106 may be a production workload or a development workload or a testing workload, depending on the customer's requirement. In some examples, the production workload may include running an automated teller machine (ATM) application program or a payroll application program or performing live video analytics. Similarly, the development workload may include running a set of processes and programming tools to create a new application program or a software product. Further, the testing workload may include running another set of processes and testing tools to test the new application program or the software product. Typically, the workload 106 will be executed in the plurality of infrastructure resources 130 for certain duration depending on the business requirement. Further, the workload 106 may be classified as either a critical workload or a non-critical workload by either the customer or the administrator 108 of the example environment 100.

In some examples, the plurality of external computing systems 110 may include an operating system module 110A to provide new patches related to proprietary operating systems, a hardware module 110B to provide new patches related to a proprietary hardware, an application module 110C to provide new patches related to proprietary applications, and a national vulnerability database (NVDB) portal 110D to provide information about new security vulnerabilities corresponding to the plurality of infrastructure resources 130. The patch management system 102 may be operably coupled to the each of the plurality of external computing systems 110 to download the new patches from corresponding modules.

During operation of the example environment 100, the customer may place a request to the administrator 108 to execute the workload 106 in the cloud computing system 104. As discussed hereinabove, the workload 106 may be to perform live video analytics. Accordingly, the administrator 108 may analyze the workload 106 to identify the plurality of infrastructure resources 130 that may be required for executing the workload 106. Thereafter, the administrator 108 may enter a workload configuration including hardware configurations, operating system (OS)/hypervisor details, and application details that are identified for executing the workload 106 in the defined framework or template. A sample workload configuration filled by the administrator 108 may be as represented in table-1, below.

TABLE 1

| WORKLOAD TYPE | LIVE VIDEO ANALYTICS | |
|---|---|---|
| CPU CAPACITY | 2 GIGAHERTZ | |
| MEMORY | 2 TERABYTE | |
| HARDWARE | SERVER - 1 BL480C | IP ADDRESS - 1 |
| DETAILS | SERVER - 2 BL480C | IP ADDRESS - 2 |
| | SERVER - 3 BL480C | IP ADDRESS - 3 |
| | SERVER - 4 BL480C | IP ADDRESS - 4 |
| | STORAGE 3 PAR | IP ADDRESS - 5 |
| HOST DETAILS | OPERATING SYSTEM - 1 | |
| | HYPERVISOR | |
| | IOS | |
| APPLICATION | DATABASE | |

TABLE 1-continued

| DETAILS | WEB APPLICATION CONTAINERS VIRTUAL MACHINE |
|---|---|

The administrator 108 may then upload the identified workload configuration 107A as per the table-1, in the patch management system 102. Subsequently, the workload analyzer engine 128 may analyze the plurality of infrastructure resources 130 as per the workload configuration 107A to obtain information of existing patches for each of a plurality of infrastructure resources 130 that is identified for executing the workload 106. In some example, the workload analyzer engine 128 may perform certain functions, such as discovery of the cloud computing system 104 for obtaining the information about the existing patches corresponding to each of the plurality of infrastructure resources 130. In such examples, the information obtained on the existing patches may be documented in a tabular form.

For example, table-2 may represent the information of the existing patches corresponding to the plurality of infrastructure resources 130 that are identified for executing the workload 106.

TABLE 2

| HARDWARE LAYER | BASEBOARD MANAGEMENT CONTROLLER (BMC) | BMC PATCH - 1 |
|---|---|---|
| | ONBOARD ADMINISTRATOR (OA) | OA PATCH - 1 |
| | STORAGE | STORAGE PATCH - 1 |
| | ETHERNET SWITCH | ETH SWITCH PATCH - 1 |
| | STORAGE AREA NETWORK SWITCH | SAN SWITCH PATCH - 1 |
| HOST LAYER | OS - 1 | OS PATCH - 1 |
| | HYPERVISOR | HYPERVISOR PATCH - 1 |
| | BAREMETAL OS | BARE PATCH - 1 |
| | DOCKER (VIRTUALIZATION) | DOCKER PATCH - 1 |
| APPLICATION LAYER | APACHE SPARK | APACHE SP PATCH - 1 |
| | CASSANDRA | CAS PATCH - 1 |
| | AZURE CONTAINER | AZ PATCH - 1 |
| | VMWARE | VM PATCH - 1 |
| | ORACLE | ORACLE PATCH - 1 |
| | KAFKA | KAFKA PATCH - 1 |

It may be noted herein that the plurality of infrastructure resources 130 is segregated as multiple layers including a hardware layer, a host layer, and an application layer, as represented in table-2.

Figure 2:
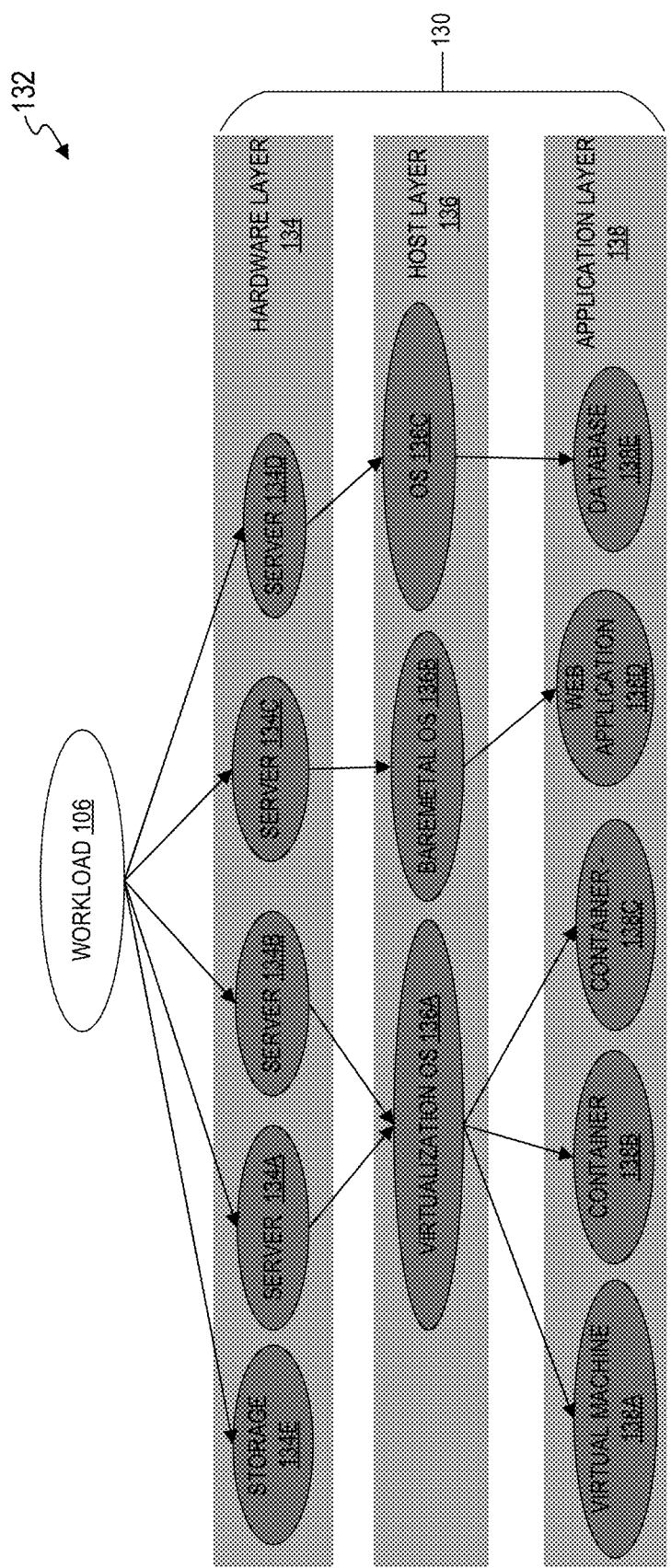
FIG. 2 is an example dependency graph, in accordance with embodiments of the present disclosure.

The workload analyzer engine 128 may further analyze the cloud computing system 104 to determine the dependency of each of the plurality of infrastructure resources 130 across the multiple layers. In some examples, the workload analyzer engine 128 may analyze a dependency document or graph (as shown in FIG. 2) to determine the dependency of the plurality of infrastructure resources 130. In some examples, the dependency document may be generated by the administrator 108, while generating the workload configuration 107A (as shown in table-1). However, in some other examples, the dependency document may be a well-defined standard document for the workload 106. For example, manufacturer-1 may have a well-defined standard document for a workload, such as SAP HANA workload. In such examples, manufacturer-1 may have generated such standard document based on reference architecture that provides recommended practices/well defined requirements of the hardware, host, and application layers. In one or more examples, the determined dependency of the plurality of infrastructure resources 130 for executing the workload 106, may be represented in a form a dependency graph 132, as shown in FIG. 2 of the present disclosure.

Referring to FIG. 2, an example dependency graph 132 for the workload 106 may include the plurality of infrastructure resources 130 segregated as multiple layers including a hardware layer 134, a host layer 136, and an application layer 138. Each layer in the multiple layers may have an interface only to the layer above it and the layer below it. For example, the host layer 136 has the interface with the hardware layer 134 and the application layer 138. In the example embodiment, the hardware layer 134 has four servers 134A-134D and a storage 134E, the host layer 136 has a Virtualization OS 136A, Baremetal OS 136B, and OS 136C, for example, WINDOWS 2008 and the application layer 138 includes a virtual machine 138A, a first container 138B, a second container 138C, an application 138D, and a database 138E. It may be noted that the dependency graph 132 represented herein is merely for an illustration purpose and should not be construed as a limitation of the present disclosure. Referring to the dependency graph 132, it may be noted that the virtual machine 138A, and the first and second containers 138B, 138C are dependent on the virtualization OS 136A, which is dependent on the first and second servers 134A, 134B. Similarly the database 136E is dependent on the OS 136C, which is dependent on the fourth server 134D. The dependency graph 132 may be used by the patch management system 102, while installing the new patches on the plurality of infrastructure resources 130 across the multiple layers. In other words, the new patches has to be installed in an order of dependency, as listed in the dependency graph 132. For examples, if the patch management system 102 has to install two new patches on the infrastructure resources 130, one each for the OS 136C and the database 138E. In such scenario, the patch management system 102 may first install the patch corresponding to the OS 136C, and following that the patch corresponding to the database 138E may be installed.

Referring back to FIG. 1, the patch management system 102 may later identify a security vulnerability related to the plurality of infrastructure resources 130. In some examples, an agent, such as a monitoring agent 140A of a plurality of agents 140 stored in the agent's repository 120, may monitor the NVDB portal 110D for identifying the security vulnerability corresponding to the plurality of infrastructure resources 130. In some other examples, the patch management system 102 may receive security vulnerability alert messages from the NVDB portal 110D. In such examples, the monitoring agent 140A may analyze the received alert messages, for example, by applying a natural language processing (NLP) algorithm to identify the security vulnerability for the corresponding infrastructure resource 130.

Further, at least one patch update engine among the patch update engines 122 may analyze the existing patches as shown in table-2, to determine if the identified security vulnerability is already remediated or not, in the corresponding infrastructure resource 130. If the at least one patch update engine 122 determines that the identified security vulnerability is already remediated, then the patch management system 102 may document that information in a log file or a database, for example, and ignore the subsequent steps of remediating that particular security vulnerability. However, if the patch management system 102 determines that the identified security vulnerability is not remediated in the corresponding infrastructure resource 130, then it may initiate the process of identifying and downloading new patches 142, for installing on the corresponding infrastructure resource 130. In some examples, if it is identified that the identified security vulnerability corresponds to the OS 136C and the database 138E, then the patch management system 102 may determine agents, for examples, resource-specific agents 140B, 140C for identifying and downloading a first new patch 142A and a second new patch 142B from respective sources. For example, the respective sources for downloading the first patch 142A corresponding to the OS 136C may be the operating system module 110A, and the second patch 142B corresponding to the database 138E may be the application module 110C. After the resource-specific agents 140B, 140C downloads the first and second new patches 142A, 142B, the patch management system 102 may maintain the first and second new patches 142A, 142B in a store, such as the patch repository 118.

In some other examples, the first and second new patches 142A, 142B respectively may have already been maintained in the patch repository 118. In such examples, the resource-specific agents 140B, 140C may check the store, for example, the patch repository 118 to determine whether the identified first and second new patches 142A, 14B are already exist in the patch repository 118, before downloading them from the respective sources.

Later, the patch management system 102 may evaluate respective perceived criticalities of the first new patch 142A and the second new patch 142B for the identified security vulnerability. In some embodiments, the perceived criticality for each of the first and second new patches 142A, 142B may be determined based on formula-1, as mentioned below. It may be noted herein that the below mentioned formula-1 is derived based on a plurality of parameters including a workload weightage, a resource age of the plurality of infrastructure resources, and an actual criticality of the first and second new patches 142A, 142B.

$$Pc = (1 - 1/(Wwc + Wa + Pac)) * 100 \qquad (1)$$

where, (Pc) refers to perceived patch criticality, (Wwc) refers to workload weightage, (Wa) refers to resource age, and (Pac) refers to actual criticality of the patch.

In some examples, the administrator 108 may define the weightage of the workload (Wwc). For example, the mission critical workload, which may be categorized as a highly critical workload may carry higher weightage. The production workload, which may be categorized as a critical workload may carry a medium weightage, and the development workload or a demo workload or the testing workload, which may be categorized as a non-critical workload may carry a lesser weightage. In some examples, the administrator 108 may define the workload weightage (Wwc) in a scale of 1-10, where the weightage of 1-4 is for the non-critical workload, the weightage of 5-7 is for the critical workload, and the weightage of 8-10 is for the highly critical workload.

Similarly, the administrator 108 may provide the details about the workload age (Wa), by referring to table-2. For example, an older version of the operating system are highly vulnerable to attacks and taken care with highest priority. For instance, the older version of operating system, for example, default WINDOWS 2012 or default WINDOWS 2008, may not contain the new patches which may remediate particular attacks, for example, the Wannacry or Notpetya attacks. Therefore, higher the workload age means the older version of the operating system and higher the weightage or the criticality. Similarly, lesser the workload age means a latest version of the operating system and lower the weightage or criticality. The scale of 1-10 may be used to define the workload age (Wa), where the weightage of 1-4 is for the latest version of the workload, the weightage of 5-7 is for the relatively older version of the workload, and the weightage of 8-10 is for the older version of the workload.

The actual criticality (Pac) is defined by the NVDB portal 110D for the first and second new patches 142A, 142B based on the criticality of the security vulnerability for the corresponding infrastructure resource 130. The scale of 1-10 may be used to define the actual criticality (Pac), where the weightage of 0.1-3.9 is for the non-critical security vulnerability, the weightage of 4.0-6.9 is for medium security vulnerability, the weightage of 7.0-8.9 is for high security vulnerability, and the weightage of 9.1-10 is for the critical security vulnerability.

The patch management system 102 may calculate the perceived criticality (Pc) for each of the first and second new patches 142A, 142B. In some examples, since the workload 106 is for performing live video analytics, it is considered to be a highly critical workload for the customer. Therefore, the workload weightage (Wwc) may have the weightage of "9". Similarly, the OS 136C, for example, WINDOWS 2008 and the database, for example, Oracle-7, are also considered to be older versions, thereby have the weightage of "9". The actual criticality (Pac) for the security vulnerability is identified to be critical and accordingly have the weightage of "9.1". Therefore, the perceived criticality (Pac) for each of the first and second patches 142A, 142B is determined to be 96. Typically, the higher percentage of perceived criticality (Pc) means the patch is critical for the infrastructure resources 130 executing the workload 106.

In some examples, the customer or the administrator 108 may define a predefined criticality (Pcc) for the workload 106 to determine whether the new patches are critical or non-critical for the workload 106. In some examples, the customer may have defined the predefined criticality (Pcc) to have a threshold value of "95". In such examples, the perceived criticality (Pc) of each of the first and second new patches 142A, 142B having a value of "96" is greater than the predefined criticality (Pcc) having a threshold value of "95". Thus, the patch management system 102 may consider installing each of the first and second new patches 142A, 142B on the corresponding infrastructure resources 130 to secure the workload 106 from the security vulnerability.

The patch update engine 122 may then identify at least one patch update engine 122A from the plurality of patch update engines 122 for installing the first and second new patches 142A, 142B on the corresponding infrastructure resources 130. In some embodiments, the at least one patch update engine 122A is identified based on a quality of communication index Q(i). In some examples, the quality of communication index is defined in accordance to formula-2, as mentioned below.

$$Q(i)=\Sigma_{k=1}^{n}Fk \qquad (2)$$

where, Q(i) refers to quality of communication index, $\Sigma_k^n$ refers to set of features, and Fk refers to set of features that needs to be handled by the patch update engine 122. For example, the set of features may include i) ability of login, ii) ability to interact with the plurality of infrastructure resources 130, for examples understanding of protocol, such as SNMP, redfish, etc., iii) patch update commands, and the like.

In some examples, if a first patch update engine 122A can interact with the servers 134C, 134D, the OS 136C, and the database 138E, and a second patch update engine 122B can interact with only the server 134D and the storage 134E. The patch management system 102 may chose the first patch update engine 122A over the second patch update engine 122B, based on the quality of communication index Q(i), as per the formula (2).

In some examples, the patch preview engine 124 may create various previews using the information available from the new patches 142, before installing the new patches 142 on the corresponding infrastructure resource 130. The patch preview engine 124 may employ the NLP algorithm to build the preview 107B to the administrator 108. For example, if the new patches 142 disables SNMP ports, the preview builder might use context aware NLP on the associated release notes of the new patches 142 to derive the disabled ports and its impact on the workload 106.

Further, the first patch update engine 122A may establish connection with the corresponding infrastructure resource 130 and install the first new patch 142A followed by the second new patch 142B on the plurality of infrastructure resources 130. In particular, the first patch update engine 122A may first install the first new patch 142A on the OS 136C and following which the second new patch 142B may be installed on the database 138E as per an order of the dependency of the plurality of infrastructure resources 130. In some examples, the first and second new patches 142A, 142B may be installed at runtime of the workload 106, without requiring the workload 106 to be restarted for applying the new patches 142 on the infrastructure resources 130.

In some embodiments, the workload monitor engine 126 may continuously monitor a workload topology or configuration (as per the table-1) to determine addition of a new infrastructure resource for executing the workload 106. If any new infrastructure is added the workload configuration, than the patch management system 102 may install one or more new patches on the new infrastructure resources, in the order of determined dependency, for securing the workload 106 from the identified security vulnerability. The workload monitor engine 126 may also actively track for new security vulnerabilities and keep the patches up-to-date on the plurality of infrastructure resources 130.

While, the patch management system 102 continuously monitor for new security vulnerabilities on the plurality of infrastructure resources 130, it may identify another security vulnerability. In such examples, the patch management system 102 may identify a third new patch 142C for remediating the other security vulnerability. Later, the patch management system 102 may evaluate the perceived criticality (Pc) of the third new patch 142C for the other security vulnerability based on the plurality of parameters, as discussed hereinabove.

In one example, the perceived criticality (Pc) of the third new patch 142C may be less than the predefined criticality (Pcc). In such cases, the patch management system 102 may defer installing the third new patch 142C on the corresponding infrastructure resource 130 based on the perceived criticality (Pc).

Over a period a time, the patch management system 102 may have a list of deferred new patches. In such examples, the deferred new patches along with the third new patch 142C may be installed on the corresponding infrastructure resources 130 during a pre-scheduled patch update period for the workload 106 so as to secure the workload from the other security vulnerabilities. In one or more examples, the pre-scheduled patch update period may be a scheduled downtime of the workload 106 or during maintenance window period of the workload 106.

In some other examples, at least one of the plurality of parameters used to evaluate the perceived criticality (Pc) of the third patch 142C may change over a period of time. For example, the workload 106 may shift from non-critical to highly critical workload, thus changing the workload weightage (Wwc) or the actual criticality (Pac) of the third new patch 142C from critical to highly-critical workload. In some other examples, the application may become older over the period of time, thus changing the status of the workload age (Wc) from latest version to relatively older version of the workload. In such scenarios, the patch management system 102 may re-evaluate the perceived criticality (Pc) of the third new patch 142C based on a revision of at least one parameter of the plurality of parameters, as discussed hereinabove. If the re-evaluated perceived criticality (Pc) is identified to be greater than the predefined criticality (Pcc), than the at least one patch update engine 122A may install the third new patch 142C on the corresponding infrastructure resource 130 for securing the workload from the other security vulnerability.

Figure 3:
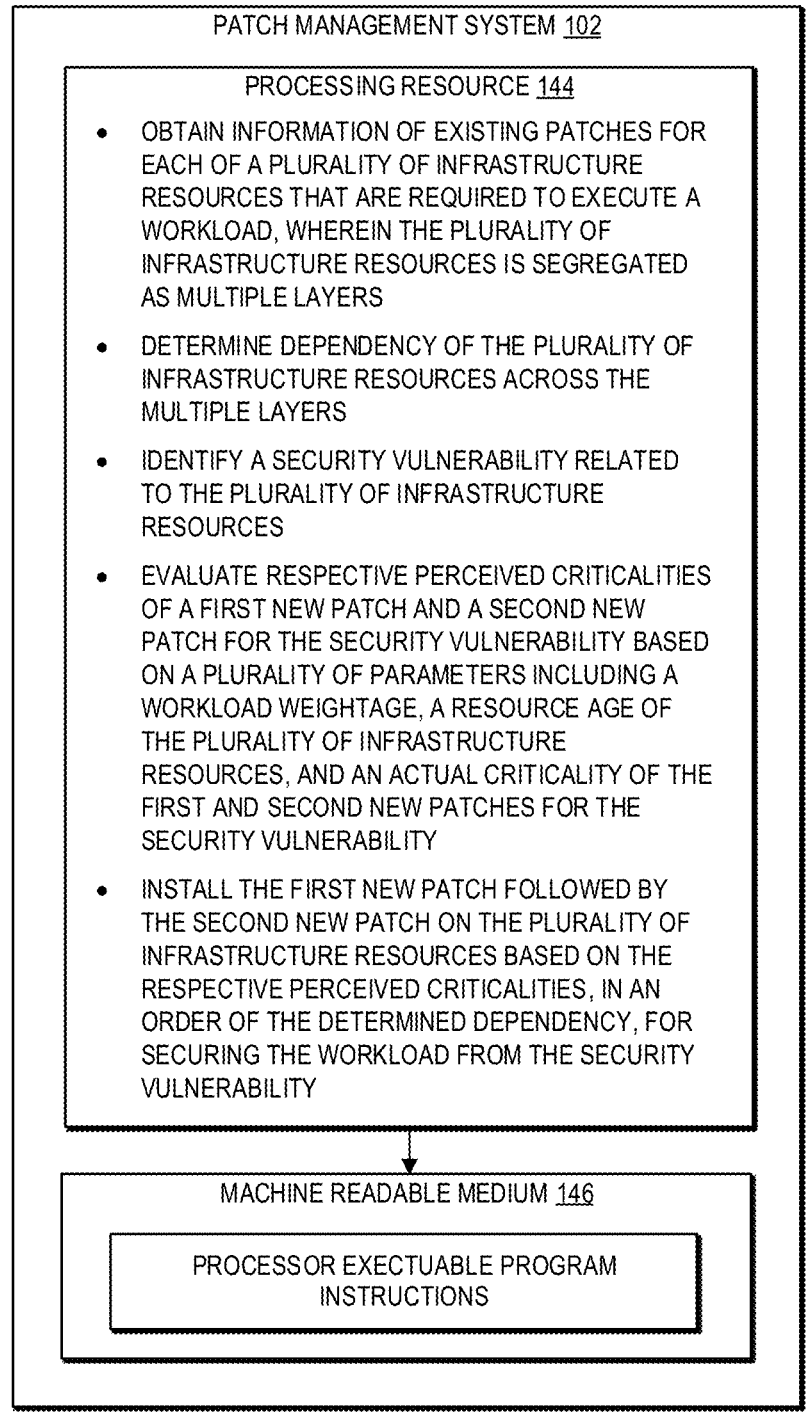
FIG. 3 is a block diagram depicting a computing system, for example, a patch management system having a processing resource operably coupled to a machine readable medium storing executable program instructions, in accordance with embodiments of the present disclosure.

FIG. 3 is a block diagram of a computing system, for example, a patch management system 102 including a processing resource 144 and a machine readable medium 146 storing executable program instructions. It should be noted herein that the patch management system 102 referred to in FIG. 3 may be same or similar to patch management system 102 described in FIG. 1. In the example embodiment, the processing resource 144 is operably coupled to the machine readable medium 146.

The processing resource 144 may be a physical processor. In some examples, the physical processor may be at least one of a central processing unit (CPU), a graphics processing unit (GPU), a microprocessor, and/or other hardware devices suitable for performing the functionality described in relation to FIG. 1. In some examples, the machine readable medium 146 is non-transitory and is alternatively referred to as a non-transitory machine readable medium.

The processing resource 144 executes one or more program instructions to perform one or more functions described in FIG. 1. For example, the processing resource 144 may execute program instructions to obtain information of existing patches for each of a plurality of infrastructure resources that are required to execute a workload. In some examples, the plurality of infrastructure resources is segregated as multiple layers including a hardware layer, a host layer, and an application layer. The processing resource 144 may receive a workload configuration details from an administrator, which includes details of the plurality of infrastructure resources that are required to execute the workload of a customer. Subsequently, the processing resource 144 may perform the function of discovering the infrastructure resources to obtain the information of existing patches. The steps of obtaining the information about the existing patches from the plurality of infrastructure resources is described in conjunction with FIG. 1. The processing resource 144 may further execute the program instructions to determine dependency of the plurality of infrastructure resources across the multiple layers. The dependency of the each of the plurality of infrastructure resources may be documented in a form a graph, as described in conjunction with FIG. 2. Further, the processing resource 144 may execute the program instructions to identify a security vulnerability related to the plurality of infrastructure resources.

In some examples, the processing resource 144 may identify the security vulnerability of the workload by accessing the information from the national vulnerability database (NVDB) portal. The steps involved in identifying the security vulnerability in the plurality of infrastructure resources are described in conjunction with FIG. 1. The processing resource 144 further executes the program instructions to evaluate respective perceived criticalities of a first new patch and a second new patch for the security vulnerability based on a plurality of parameters. In some embodiments, the plurality of parameters includes a workload weightage, a resource age of the plurality of infrastructure resources, and an actual criticality of the first and second new patches for the security vulnerability. The steps of evaluating the perceived criticality of each of the plurality of patches is described in FIG. 1. Further, the processing resource 144 may install the first new patch followed by the second new patch on the plurality of infrastructure resources based on the respective perceived criticalities, in an order of the determined dependency, for securing the workload from the security vulnerability. The steps of installing the first and second new patches on the corresponding infrastructure resources is described in FIG. 1.

In some examples, the processing resource 144 may defer the installation of the new patch based on the determined perceived criticality for the new patch. In such examples, the processing resource 144 may install the new patch either during the pre-scheduled patch update period for the workload or after re-evaluating the perceived criticality of such deferred new patch to determine that the perceived criticality is now greater than the predefined criticality, based on a revision of the at least one parameter related to the workload or the security vulnerability.

Figure 4:
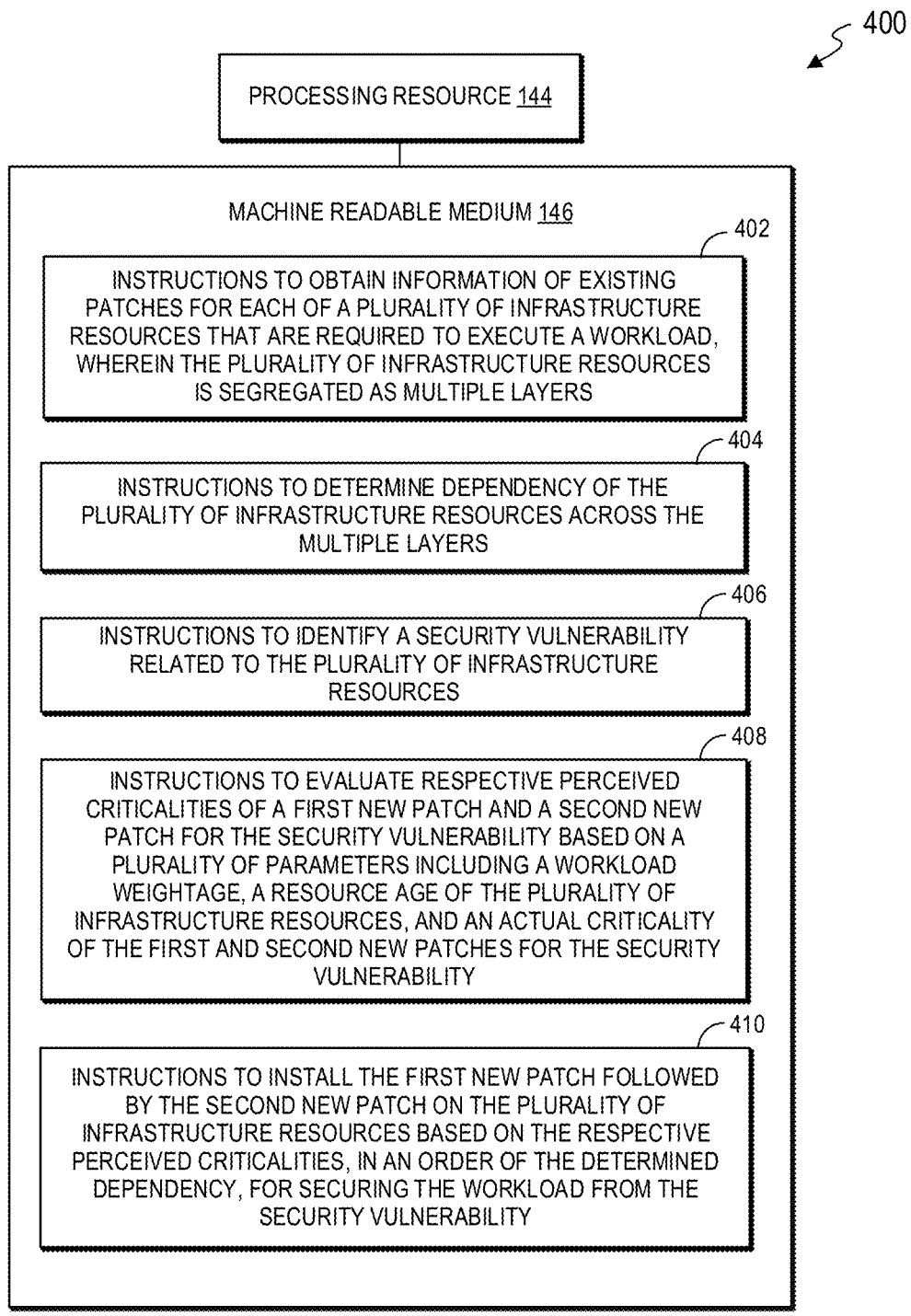
FIG. 4 is a block diagram depicting a processing resource and a machine readable medium encoded with example instructions to process data in a computing system, for example, a patch management system, in accordance with embodiments of the present disclosure.
Figure 5:
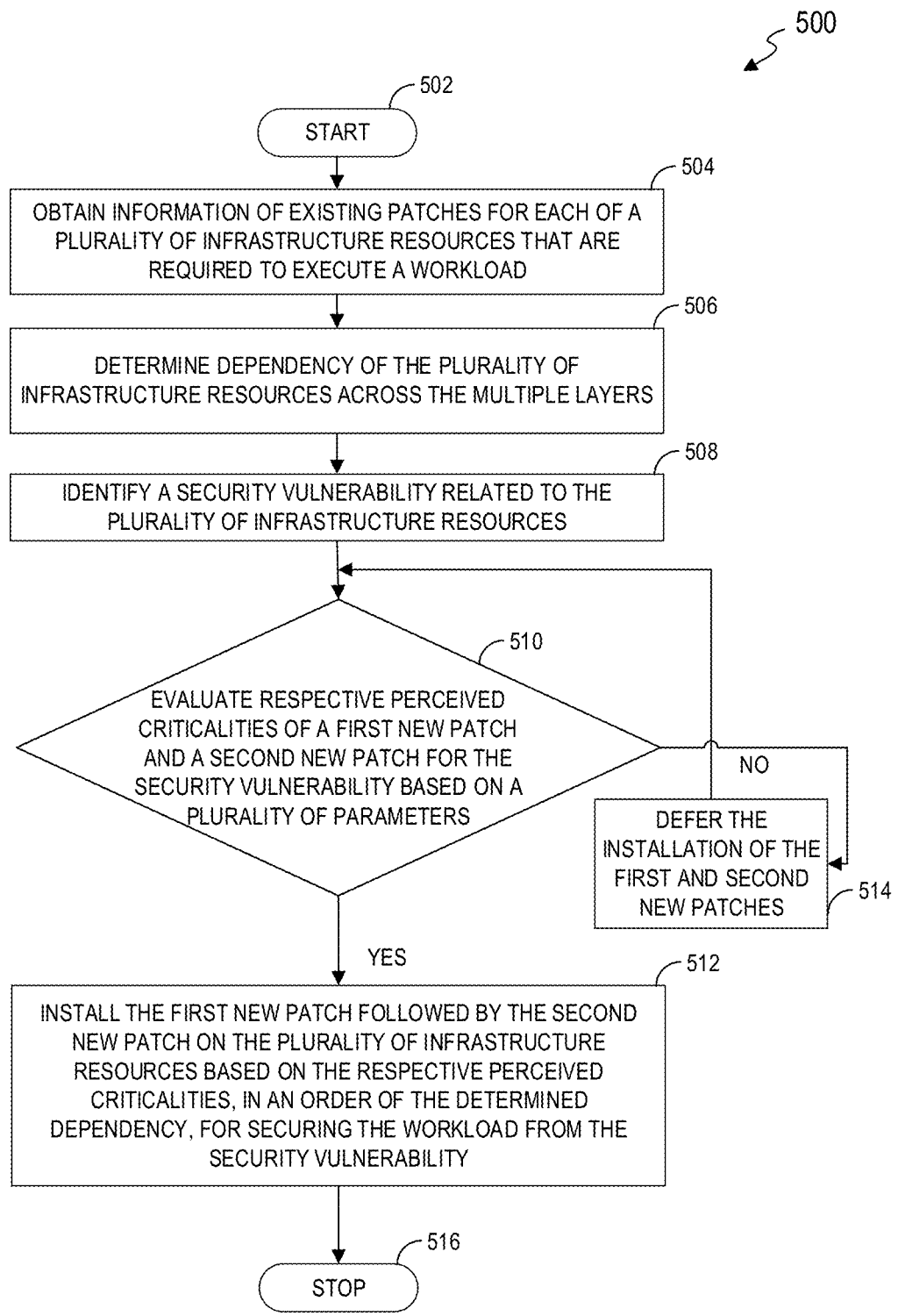
FIG. 5 is a flow diagram depicting a method of securing a workload hosted in a hybrid cloud environment using a patch management system, in accordance with embodiments of the present disclosure.

FIG. 4 is a block diagram 400 depicting a processing resource 144 and a machine readable medium 146 encoded with example instructions to process data in a computing system, such as a patch management system 102. In some examples, the patch management system 102 is operated in an example environment, for secure management of workload from one or more security vulnerabilities on the plurality of infrastructure resources used to execute the workload. It should be noted herein that the patch management system 102 referred to in FIG. 4 may be same or similar to patch management system 102 described in FIGS. 1 and 3. The machine readable medium 146 is non-transitory and is alternatively referred to as a non-transitory machine readable medium. In some examples, the machine readable medium 146 may be accessed by the processing resource 144. In some examples, the machine readable medium 146 stores the program instructions corresponding to functionality of a patch management system 102, as discussed in FIG. 1.

The machine readable medium 146 may be encoded with example instructions 402, 404, 406, 408, 410. In some examples, a plurality of infrastructure resources that are required to execute the workload is first identified by administrator of a cloud computing system hosting the workload. In such examples, the instruction 402, when executed by the processing resource 144, may implement aspects of obtaining information of existing patches for each of the plurality of infrastructure resources that are required to execute the workload, where the plurality of infrastructure resources is segregated as multiple layers comprising a hardware layer, a host layer, and an application layer. The step of obtaining the information of existing patches may be performed by the workload analyzer engine of the patch management system 102, as described in FIG. 1.

The instruction 404, when executed, may cause the processing resource 144 to determine dependency of the plurality of infrastructure resources across the multiple layers, as described in FIG. 1. The steps of determining the dependency may be performed by the workload analyzer engine, as described in FIG. 1.

The instruction 406, when executed, may cause the processing resource 144 to identify a security vulnerability related to the plurality of infrastructure resources, as described in FIG. 1. The steps of identifying the security vulnerability may be performed by at least one monitoring agent, as described in FIG. 1.

Further, the instructions 408, when executed, may cause the processing resource 144 to evaluate respective perceived criticalities of a first new patch and a second new patch for the security vulnerability based on a plurality of parameters including a workload weightage, a resource age of the plurality of infrastructure resources, and an actual criticality of the first and second new patches for the security vulnerability, as described in FIG. 1. In particular, the processing resource 144 may compare the perceived criticality of each new patch with a predefined criticality to determine whether the new patches are critical or non-critical for the workload, as described in FIG. 1.

In some embodiments, the instructions 410, when executed, may cause the processing resource 144 to install the first new patch followed by the second new patch on the plurality of infrastructure resources if the new patches are critical to the workload, in an order of the determined dependency, for securing the workload from the security vulnerability. The steps of installing the new patches, on the corresponding infrastructure resources which are identified to be critical to the workload, may be performed by at least one patch update engine, as described in FIG. 1.

In one or more examples, the processing resource 144 may defer the installation of new patch, if the processing resource identifies during the evaluation of perceived criticality that the new patch is non-critical to the workload. However, the processing resource may install the deferred new patch during a pre-scheduled patch update period for the workload to secure the workload from the other security vulnerability. Alternately, the processing resource 144 may install the deferred new patch after re-evaluating the perceived criticality of such deferred new patch to determine that the perceived criticality is now greater than the predefined criticality, based on a revision of the at least one parameter related to the workload or the security vulnerability.

FIG. 5 is a flow diagram depicting a method 500 of securing a workload hosted in a hybrid cloud environment in accordance to embodiments of the present disclosure. It should be noted herein that the method 500 is described in conjunction with FIG. 1.

The method 500 starts at block 502 and continues to block 504. At block 504, the method 500 includes obtaining information of existing patches for each of a plurality of infrastructure resources that are required to execute a workload, as described in FIG. 1. In one or more examples, the plurality of infrastructure resources is segregated as multiple layers including a hardware layer, a host layer, and an application layer. In some examples, the method 500 includes identifying a workload configuration i.e., information about the plurality of infrastructure resources that are required to execute the workload by an administrator of the cloud computing system, before obtaining the existing patches details from the cloud computing system. In one embodiment, the workload configuration information may be entered in a tabular form as shown in table-1, and described hereinabove in FIG. 1. Similarly, the information of the existing patches of the identified infrastructure resources may be entered in a tabular form as shown in table-2 and described in FIG. 1.

Further, the method 500 continues to block 506. At block 506, the method 500 includes determining dependency of the plurality of infrastructure resources across the multiple layers, as described in FIGS. 1 and 2. In some examples, the dependency of the plurality of infrastructure resources may documented in a form a graph as illustrated in FIG. 2. The method 500 further continues at block 508.

At block 508, the method 500 includes identifying a security vulnerability related to the plurality of infrastructure resources, as described in FIG. 1. In some examples, the security vulnerability may be identified by either accessing information in a national vulnerability database (NVDB) portal or analyzing the alert message received from the NVDB portal. The method 500 continues to block 510.

At block 510, the method 500 includes evaluating respective perceived criticalities of a first new patch and a second new patch for the identified security vulnerability based on a plurality of parameters. In some embodiments, the plurality of parameters includes a workload weightage, a resource age of the plurality of infrastructure resources, and an actual criticality of the first and second new patches for the security vulnerability. In some example, at block 510, if it is determined that the perceived criticality of each of the first and second new patches is greater than a predefined criticality ("YES" at block 510), then the method includes installing the first new patch followed by the second new patch on the plurality of infrastructure resources based on the respective perceived criticalities, in an order of the determined dependency, for securing the workload from the security vulnerability, at block 512. In some example, at block 510, if it is determined that the perceived criticality of each of the first and second new patches is lesser than the predefined criticality ("NO" at block 510), then the method includes deferring the installation of the first and second new patches, at block 514.

In one or more embodiments, the method 500 includes a step of installing the deferred new first and second new patches during a pre-scheduled patch update period for the workload to secure the workload from the security vulnerability. Alternately, the method 500 includes a step of re-evaluating the perceived criticality of the first and second new patches based on a revision of the at least one parameter related to the workload or the security vulnerability, at block 510. If it is determined that the perceived criticality of those deferred first and second new patches are now greater than the predefined criticality ("YES" at block 510), then the method 500 includes installing the first and second new patches, at block 512. The method 500 ends at block 516.

Various features as illustrated in the examples described herein may be implemented to secure a workload from one or more security vulnerabilities on a plurality of infrastructure resources identified for executing the workload. In particular, a patch management system may evaluate a criticality of the new patch before installing on the infrastructure resources, thereby prevent the installation of all new patches, which may not be essential for the security of the workload. Thus, the installation of only critical new patches may not stall the workload, thereby making the mission-critical production workload to be highly available for providing the intended services to the clients. Also, timely installation of highly-critical patches may prevent the business downtime of the intended services provided by the workload. The patch management system may be offered as a service or can be offered in a form of container to be deployed in a hybrid cloud environment. The patch management system requires minimal intervention from the administrator for vulnerability detection and remediation, thereby automatically managing the workload from security vulnerabilities.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
obtaining, by a processing resource, information of existing patches for each of a plurality of infrastructure resources that are required to execute a workload, wherein the plurality of infrastructure resources is segregated as multiple layers comprising a hardware layer, a host layer, and an application layer;
determining, by the processing resource, dependency of the plurality of infrastructure resources across the multiple layers;
identifying, by the processing resource, a first security vulnerability related to the plurality of infrastructure resources;
calculating, by the processing resource, a first perceived criticality of a first new patch for the first security vulnerability using a defined actual criticality of the first new patch for the first security vulnerability and a plurality of parameters corresponding to at least the following: a workload weightage, and a resource age of the plurality of infrastructure resources;
calculating, by the processing resource, a second perceived criticality of a second new patch for the first security vulnerability using a defined actual criticality of the second new patch for the first security vulnerability and the plurality of parameters corresponding to at least the following: a workload weightage, and a resource age of the plurality of infrastructure resources;
evaluating, by the processing resource, the first perceived criticality and the second perceived criticality based on the plurality of parameters and an order of the determined dependency of the plurality of infrastructure resources across the multiple layers; and
installing, by the processing resource, the first new patch followed by the second new patch on the plurality of infrastructure resources based on the evaluation of the first perceived criticality and the second perceived criticality, in the order of the determined dependency.

2. The method of claim 1, wherein evaluating the first perceived criticality and the second perceived criticality comprises determining if each of the first perceived criticality and the second perceived criticality is greater than a predefined criticality, wherein the predefined criticality is defined by a customer or an administrator of the workload.

3. The method of claim 1, further comprising:
identifying, by the processing resource, a second security vulnerability related to the plurality of infrastructure resources;
evaluating, by the processing resource, a third perceived criticality of a third new patch for the second security vulnerability based on the plurality of parameters; and
deferring, by the processing resource, installing the third new patch based on the third perceived criticality.

4. The method of claim 3, further comprising installing, by the processing resource, the third new patch on the corresponding infrastructure resource during a pre-scheduled patch update period for the workload to secure the workload from the second security vulnerability.

5. The method of claim 3, further comprising:
re-evaluating, by the processing resource, the third perceived criticality based on a revision of at least one parameter of the plurality of parameters used for determining the first perceived criticality and second perceived criticality; and
installing, by the processing resource, the third new patch on the corresponding infrastructure resource based on the third perceived criticality for securing the workload from the second security vulnerability.

6. The method of claim 1, wherein installing the first and second new patches further comprises identifying at least one patch update engine from a plurality of patch update engines based on an index parameter corresponding to a determined quality of communication for installing the first and second new patches on the plurality of infrastructure resources.

7. The method of claim 1, further comprising analyzing, by the processor based device, the existing patches to determine if the first security vulnerability is remediated in the plurality of infrastructure resources before installing the first and second new patches.

8. The method of claim 1, wherein installing the first new patch and the second new patch further comprises:
identifying, by the processing resource, the first new patch and the second new patch for remediating the security vulnerability; and
downloading, by the processing resource, the first new patch and the second new patch from at least one source or patch repository, by using at least one resource-specific agent from a plurality of resource-specific agents.

9. The method of claim 1, wherein the workload weightage and the resource age of the plurality of infrastructure resources are defined by an administrator of the workload.

10. The method of claim 1, wherein the defined actual criticality of the first and second new patches for the first security vulnerability is defined in a vulnerability database.

11. A computing system comprising:
a machine readable medium storing program instructions; and
a processing resource operably coupled to the machine readable medium, wherein the processing resource executes the program instructions to:
obtain information of existing patches for each of a plurality of infrastructure resources that are required to execute a workload, wherein the plurality of infrastructure resources is segregated as multiple layers comprising a hardware layer, a host layer, and an application layer;
determine dependency of the plurality of infrastructure resources across the multiple layers;
identify a first security vulnerability related to the plurality of infrastructure resources;
calculate a first perceived criticality of a first new patch for the first security vulnerability using a defined actual criticality of the first new patch for the first security vulnerability and a plurality of parameters corresponding to at least the following: a workload weightage, and a resource age of the plurality of infrastructure resources;
calculate a second perceived criticality of a second new patch for the first security vulnerability using a defined actual criticality of the second new patch for the first security vulnerability and the plurality of parameters corresponding to at least the following: a workload weightage, and a resource age of the plurality of infrastructure resources;

evaluate the first perceived criticality and the second perceived criticality based on the plurality of parameters and an order of the determined dependency of the plurality of infrastructure resources across the multiple layers; and install the first new patch followed by the second new patch on the plurality of infrastructure resources based on the evaluation of the first perceived criticality and the second perceived criticality, in the order of the determined dependency.

12. The computing system of claim 11, wherein executing the program instructions to evaluate the first perceived criticality and the second perceived criticality further comprises executing the program instructions to determine if each of the first perceived criticality and the second perceived criticality is greater than a predefined criticality, wherein the predefined criticality is defined by a customer or an administrator of the workload.

13. The computing system of claim 11, wherein the processing resource further executes the program instructions to:

identify a second security vulnerability related to the plurality of infrastructure resources;

evaluate a third perceived criticality of a third new patch for the second security vulnerability based on the plurality of parameters; and defer installing the third new patch based on the third perceived criticality.

14. The computing system of claim 13, wherein executing the program instructions to evaluate the perceived criticality of the third new patch further comprises executing the program instructions to install the third new patch on the corresponding infrastructure resource during a pre-scheduled patch update period for the workload to secure the workload from the second security vulnerability.

15. The computing system of claim 13, wherein executing the program instructions to evaluate the third perceived criticality of the third new patch comprises executing the program instructions to:

re-evaluate the third perceived criticality based on a revision of at least one parameter of the plurality of parameters, used for determining the first perceived criticality and second perceived criticality; and install the third new patch on the corresponding infrastructure resource based on the third perceived criticality for securing the workload from the second security vulnerability.

16. The computing system of claim 11, wherein executing the program instructions to install the first and second new patches further comprises executing the program instructions to identify at least one patch update engine from a plurality of patch update engines based on an index parameter corresponding to a determined quality of communication for installing the first and second new patches on the plurality of infrastructure resources.

17. The computing system of claim 11, wherein the processor resource further executes the program instructions to analyze the existing patches to determine if the first security vulnerability is remediated in the plurality of infrastructure resources before installing the first and second new patches.

18. The computing system of claim 11, executing the program instructions to install the first new patch and the second new patch further comprises executing the program instructions to:

identify the first new patch and the second new patch for remediating the security vulnerability; and download the first new patch and the second new patch from at least one source or patch repository, by using at least one resource-specific agent from a plurality of resource-specific agents.

19. The computing system of claim 11, wherein the workload weightage and the resource age of the plurality of infrastructure resources are defined by an administrator of the workload, wherein the defined actual criticality of the first new patch and the second new patch for the first security vulnerability is defined in a vulnerability database.

20. A non-transitory machine readable medium storing instructions executable by a processing resource in a computing system, the instructions comprising:

instructions to obtain information of existing patches for each of a plurality of infrastructure resources that are required to execute a workload, wherein the plurality of infrastructure resources is segregated as multiple layers comprising a hardware layer, a host layer, and an application layer;

instructions to determine dependency of the plurality of infrastructure resources across the multiple layers;

instructions to identify a first security vulnerability related to the plurality of infrastructure resources;

instructions to calculate a first perceived criticality of a first new patch for the first security vulnerability using a defined actual criticality of the first new patch for the first security vulnerability and a plurality of parameters corresponding to at least the following: a workload weightage, and a resource age of the plurality of infrastructure resources;

instructions to calculate a second perceived criticality of a second new patch for the first security vulnerability using a defined actual criticality of the second new patch for the first security vulnerability and the plurality of parameters corresponding to at least the following: a workload weightage, and a resource age of the plurality of infrastructure resources;

instructions to evaluate the first perceived criticality and the second perceived criticality based on the plurality of parameters and an order of the determined dependency of the plurality of infrastructure resources across the multiple layers; and instructions to install the first new patch followed by the second new patch on the plurality of infrastructure resources based on the evaluation of the first perceived criticality and the second perceived criticality, in the order of the determined dependency.

* * * * *